United States Patent Office 3,436,375
Patented Apr. 1, 1969

3,436,375
PREPARATION OF OXYMETHYLENE POLYMERS IN THE PRESENCE OF POLYHYDRIC COMPOUNDS
Francis B. McAndrew, Springfield, N.J., assignor to Celanese Corporation, New York, N.Y., a corporation of Delaware
No Drawing. Filed Dec. 14, 1965, Ser. No. 513,855
Int. Cl. C08g 1/04, 1/14
U.S. Cl. 260—67                             9 Claims

ABSTRACT OF THE DISCLOSURE

An oxymethylene polymer having improved flow properties and molding processability is prepared by polymerizing an oxymethylene polymer-forming material, e.g., trioxane, in the presence of a polyhydric compound containing at least three hydroxy groups, e.g., trimethylolpropane.

---

The present invention relates to oxymethylene polymers, having improved processability.

Oxymethylene polymers having successive oxymethylene groups may be prepared by the polymerization of trioxane or formaldehyde. These polymers, which are normally thermoplastic materials, have a unique combination of stiffness, toughness, and inertness and as a result, have achieved widespread use in molded and extruded objects. It is desirable, however, to obtain oxymethylene polymers of optimum strength properties which are readily processable, particularly by extrusion and injection molding techniques.

Accordingly, the primary object of the present invention is to provide a process for preparing an oxymethylene polymer having improved processability properties.

In accordance with the present invention, an oxymethylene polymer forming material is polymerized in the presence of a polyhydric compound containing at least three hydroxy groups to yield an oxymethylene polymer having enhanced flow and processability properties.

It has been found that when trioxane or formaldehyde is polymerized in the presence of a polyhydric compound containing at least three hydroxy groups, chain transfer and chain branching occur. These chain reactions upset the molecular weight distribution that would be obtained in their absence. This causes the product polymer to have improved flow properties and makes the polymer more amenable to extrusion and injection molding processes. However, it is important to note that chain transfer and chain branching will occur only when the polyhydric compound has at least three hydroxy groups.

The present invention is particularly directed to polymerizing trioxane or formaldehyde in the presence of a cationic catalyst and a compound which contains at least three hydroxy groups.

These catalysts which can be used in the present invention are of the cationic or Lewis acid type and must be suitable for the polymerization of trioxane or formaldehyde by themselves or with other materials. Preferred cationic catalysts include such inorganic fluorine-containing catalysts as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride, and compounds containing these materials such as boron fluoride coordinate complexes with organic compounds, particularly those in which oxygen or sulfur is a donor atom.

Other suitable catalysts include thionyl chloride, fluorosulfonic acid, methane sulfonic acid, phosphorous trichloride, titanium tetrachloride, ferric chloride, zirconium tetrachloride, aluminum trichloride, stannic chloride and stannous chloride.

The particularly preferred catalysts are boron fluoride and boron fluoride-containing materials such as boron fluoride monohydrate, boron fluoride dihydrate and boron fluoride trihydrate as well as the boron fluoride coordinate complexes with organic compounds as mentioned previously.

The coordinate complex of boron fluoride may, for example, be a complex with a phenol, an ether, an ester, or a dialkyl sulfide. Brown fluoride dibutyl etherate, the coordinate complex of boron fluoride with dibutyl ether, is a preferred coordinate complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide. Suitable catalysts are disclosed in U.S. Patents 2,989,505; 2,989,506; 2,989,507; 2,989,-508; 2,989,509; all of which are issued to Donald E. Hudgin and Frank M. Berardinelli; 2,989,510 to George J. Bruni; and 2,989,511 to Arthur E. Schnizer.

The amount of catalyst (based on the boron fluoride content) is usually in the range of from about 0.0002 to about 1 percent based on the weight of trioxane or formaldehyde, and preferably from about 0.003 to 0.010 percent for a continuous process, and from about 0.0002 to 0.007 percent for a batch system.

The oxymethylene polymers which are to be prepared by the process of the present invention are those having recurring oxymethylene units and are produced by the polymerization of formaldehyde or trioxane, cyclic trimer of formaldehyde. Suitable oxymethylene polymer products include oxymethylene homopolymers and copolymers. Preferred oxymethylene copolymers are those containing recurring oxymethylene units interspersed with —OR— groups in the main polymer chain, where R is a divalent radical containing a least two carbon atoms which are directly linked to each other and which are positioned in the polymer chain between the two valences, with any substituents on said R radical being inert, that is, those which are free of interfering functional groups and will not induce undesirable reactions. Particularly, preferred are copolymers which contain from 60 to 99.9 mol percent of recurring oxymethylene groups. Most preferred are those polymers containing from 85 to 99.9 mol percent of recurring oxymethylene groups. In a preferred embodiment R may be, for example, an alkylene or substituted alkylene group containing at least two carbon atoms.

Among the copolymers which may be utilized in accordance with this aspect of the invention are those having a structure comprising recurring units having the formula

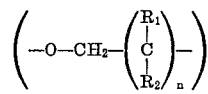

wherein $n$ is an integer from zero to 5 and wherein $n$ is zero from 60 to 99.9 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 60 to 99.9 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

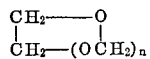

where $n$ is an integer from zero to 2.

Examples of preferred polymers include copolymers of trioxane and cyclic ethers containing at least two adjacent carbon atoms such as the copolymers disclosed in U.S. Patent No. 3,027,352 of Cheves T. Walling, Frank Brown and Kenneth W. Bartz, assigned to the Celanese Corporation of America.

Among the specific cyclic ethers which may be used are ethylene oxide; 1,3-dioxolane; 1,3,5-trioxepane; 1,2-propylene oxide; 1,2-butylene oxide; neopentyl formal; tetrahydrofuran and butadiene monoxide.

Other oxymethylene polymers and methods of preparation therefor are disclosed by Sittig in Hydrocarbon Processing and Petroleum Refiner, 41(11), p. 131–170 (November 1962) and by Kern et al. in Angewandte Chemie, 73(6), 177–186 (Mar. 21, 1961), including polymers containing repeating carbon-to-carbon single bonds in the polymer chain made by copolymerizing trioxane with cyclic ethers such as dioxane, lactones such as beta-propiolactone, anhydrides such as cyclic adipic anhydride and ethylenically unsaturated compounds such as styrene, vinyl methyl ketone, acrolein, etc.

As used in the specification and claims herein, the term "oxymethylene" includes substituted oxymethylene, where the substituents are inert with respect to the reactions in question, that is, the substituents are free of inerfering functional groups and will not introduce undesirable reactions.

In instances it may be desirable to "end-cap" the polymer molecules by such methods as esterification or etherification in order to increase their thermal stability.

As used in the specification and claims herein, the term "polymer" means polymers having one or more monomeric groups, including homopolymers, copolymers, terpolymers and higher polymers. Suitable oxymethylene terpolymers include those disclosed in now abandoned U.S. patent application Ser. No. 229,715, filed Oct. 10, 1962 by W. E. Heinz and F. B. McAndrew, assigned to the Celanese Corporation of America.

It is generally desirable to incorporate one or more thermal stabilizers into the polymer in order to reduce the thermal degradation rate of the polymer. The proportion of stabilizer incorporated depends upon the specific stabilizer used. A proportion between about 0.05 and 10 weight percent (based on the weight of the polymer) has been found to be suitable for most stabilizers.

One suitable stabilizer system is a combination of (1) an antioxidant ingredient, such as a phenolic antioxidant and most suitably a substituted bisphenol, and (2) an ingredient to inhibit chain scission, generally a compound or a polymer containing trivalent nitrogen atoms.

Suitable stabilizers and classes of stabilizers are disclosed in U.S. patent application No. 355,426 filed Mar. 27, 1964 by James F. Megee and the patents and patent applications referred to therein. The Megee application is assigned to Celanese Corporation of America.

As previously mentioned, to cause both chain transfer and chain branching during the cationic polymerization of trioxane or formaldehyde, the polyhydric compounds used in the present invention must contain three or more hydroxy groups. Any aliphatic or aromatic compound having the required number of hydroxy groups is suitable, as for example, trimethylolpropane, sorbitol, erythritol, pentaerythritol, phloroglucinol, glycerol, and carbohydrates such as glucose, fructose, and the like. The preferred polyhydroxy compounds consist of carbon, hydrogen and oxygen atoms and include trimethylolpropane, pentaerythritol and glycerol. All of them are soluble in water, in trioxane and other oxygen-containing liquids.

In order to obtain the desired processable polymeric product, the polyhydric compounds are normally added to the polymerization mixture in the range of from about 0.005 to 5.0 percent by weight of the polymerizable material present therein, and preferably from about 0.02 to 2.0 percent.

The polymerization reaction is usually carried out at temperatures between about 45° C. and about 115° C., preferably between about 60° C. and about 115° C. The reaction time for the polymerization is usually between about 0.25 to about 120 minutes or until at least 50 percent, and preferably 65 percent of the trioxane or formaldehyde is converted to a high molecular weight polymeric form. Reaction periods of 0.25 to about 3 minutes are preferred for a continuous reaction with periods of from 10 to 120 minutes preferred for batch reaction.

It may be desirable to carry out the polymerization reaction in the presence of a hydrocarbon solvent such as cyclohexane. The preferred polymerization is carred out in the presence of not more than about 20 weight percent of solvent (based on the polymerizable material), and most preferably from about 0.5 to 2 weight percent of solvent in a continuous reaction.

The present invention is additionally illustrated by the following examples.

EXAMPLE I

Part A

Trioxane and cyclohexane, in a weight ratio of trioxane to cyclohexane equal to 20, 2 weight percent ethylene oxide (based on trioxane), and 50 parts per million boron trifluoride (based on trioxane and present as boron trifluoride dibutyl etherate) were placed in a suitable glass reactor, which was then placed in a bath at a temperature of 65° C. These materials were polymerized for about 70 minutes and resulted in a polymer having a yield of 91 percent based on the reactant charge. The polymeric product had a Melt Index (MI) of 3.79, a 10× MI of 68, and a 10× MI/MI ratio of 18.

Melt Index is a measure of molecular weight and processability. It is determined by heating a sample of the polymer in a standard cylinder to a standard temperature of 190° C. and forcing it under a standard load of 2.16 kg. through a standard orifice of 0.0825 inch diameter for a standard period of 10 minutes, and weighing the polymer (in grams) passing through the orifice in this period. The test is described in detail in ASTM–D1238–57T. The 10× Melt Index is determined in a similar manner to the Melt Index but the standard load is increased ten times to 21.60 kg. The ratio of 10× MI/MI is a figure which is frequently used to indicate the processability of a material in injection molding equipment.

Part B

In another run similar to Part A 0.025 weight percent trimethylolpropane (based on trioxane) was added to the polymerization feed mixture. This material resulted in a polymeric yield of 73 percent. The polymeric product had a Melt Index of 2.97, a 10× MI of 70, and a 10× MI/MI ratio of 24.

EXAMPLE II

The procedure of Example I (Part A) was repeated except that 0.050 weight percent of trimethylolpropane (based on trioxane) was added to the feed mixture. This material resulted in a polymeric yield of 75 percent and the product had a Melt Index of 4.04, a 10× MI of 109, and a 10× MI/MI of 27.

EXAMPLE III

The procedure of Example I (Part A) was again repeated except that 0.1 weight percent of trimethylolpropane (based on trioxane) was added to the feed mixture.

This material resulted in a polymeric yield of 87 percent and a product having a Melt Index of 2.10, a 10× MI of 96.6, and a 10× MI/MI ratio of 46.

From the above examples it can be seen that when the trimethylolpropane was used a substantially higher 10× MI/MI ratio was obtained, which indicates an improved processability in molding equipment, particularly injection molding. Similar results would be obtained with other polyhydric materials having at least three hydroxy groups. The judicious use of the chain transfer and chain branching agent allows one to control the Melt Index of the oxymethylene polymers. Commerce requires oxymethylene polymers of various Melt Indexes in order to meet the many exacting processing requirements of the plastic industry. For example, polymers used in extrusion applications are generally of low (less than 5) Melt Index, while polymers used in injection molding applications are generally of high (5 to 25) Melt Index. Hence, the value of having a chain transfer and chain branching agent such as the polyhydric compound is that it provides the oxymethylene polymer producer with a means to meet the Melt Index requirements of industry.

The principle, preferred embodiments, and modes of operation of the present invention have been described in the foregoing specification. However, it should be understood that the invention, which is intended to be protected herein, may be practiced otherwise than as described without departing from the scope of the appended claims.

I claim:

1. The process of preparing a substantially water-insoluble moldable oxymethylene polymer having improved processability, which comprises polymerizing (1) an oxymethylene polymer forming material having inert functional groups with (2) an aliphatic or aromatic polyhydric compound containing at least three hydroxy groups, said polyhydric compound being present in the amount of from about 0.005 to 5.0 percent by weight, based on the total amount of said polymer forming material in the presence of a cationic catalyst.

2. The process of claim 1 wherein the polymer forming material is trioxane.

3. The process of claim 1 wherein the polymer forming material is formaldehyde.

4. The process of claim 2 wherein the polyhydric compound is trimethylolpropane.

5. The process of claim 2 wherein the polyhydric compound is pentaerythritol.

6. The process of claim 1 wherein the polymer forming material is trioxane and ethylene oxide, the polyhydric compound is trimethylolpropane and the polymerization reaction takes place in the presence of a boron fluoride-containing polymerization catalyst.

7. The process of claim 6 wherein the trimethylolpropane is present in the range of from about 0.005 to 5.0 percent by weight of the polymer forming material.

8. The oxymethylene polymer made by the process of claim 1.

9. The oxymethylene polymer made by the process of claim 7.

References Cited

UNITED STATES PATENTS

| | | | |
|---|---|---|---|
| 2,786,081 | 3/1957 | Kress | 260—615 |
| 3,249,654 | 5/1966 | Von Bonin et al. | 260—874 |
| 3,264,266 | 8/1966 | Merten et al. | 260—73 |
| 3,278,635 | 10/1966 | Bastian | 260—823 |

HAROLD D. ANDERSON, *Acting Primary Examiner.*

L. M. PHYNES, *Assistant Examiner.*

U.S. Cl. X.R.

260—64, 823